(12) United States Patent
Higuchi et al.

(10) Patent No.: US 10,442,462 B2
(45) Date of Patent: Oct. 15, 2019

(54) VEHICLE BODY STRUCTURE FOR AUTONOMOUSLY TRAVELING VEHICLE

(71) Applicant: Sharp Kabushiki Kaisha, Sakai, Osaka (JP)

(72) Inventors: Atsushi Higuchi, Sakai (JP); Kyosuke Taka, Sakai (JP); Tetsushi Ito, Sakai (JP); Kiyotaka Hirata, Sakai (JP); Kosuke Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 24 days.

(21) Appl. No.: 15/544,534

(22) PCT Filed: Feb. 26, 2016

(86) PCT No.: PCT/JP2016/055818
§ 371 (c)(1),
(2) Date: Jul. 19, 2017

(87) PCT Pub. No.: WO2016/140160
PCT Pub. Date: Sep. 9, 2016

(65) Prior Publication Data
US 2017/0369100 A1     Dec. 28, 2017

(30) Foreign Application Priority Data
Mar. 5, 2015  (JP) ................................. 2015-043493

(51) Int. Cl.
*B62D 11/04*     (2006.01)
*B61B 13/00*     (2006.01)
(Continued)

(52) U.S. Cl.
CPC ............... *B62D 11/04* (2013.01); *B60K 1/02* (2013.01); *B60K 7/0007* (2013.01);
(Continued)

(58) Field of Classification Search
CPC ................................. B62D 11/04; B62K 1/02
(Continued)

(56) References Cited

U.S. PATENT DOCUMENTS 1,863,504 A * 6/1932 Schmid, Jr. ............ B62D 11/04
                                                                180/6.5
4,094,361 A * 6/1978 Yago ........................ A62C 3/07
                                                                169/48
(Continued)

FOREIGN PATENT DOCUMENTS

| JP | 55-78729 A | 6/1980 |
|----|------------|--------|
| JP | 1-106717 A | 4/1989 |
| JP | 6-27414 U | 4/1994 |
| JP | 2001-298065 A | 10/2001 |

(Continued)

OTHER PUBLICATIONS

Official Communication issued in International Patent Application No. PCT/JP2016/055818, dated May 24, 2016.

*Primary Examiner* — Tony H Winner
(74) *Attorney, Agent, or Firm* — Keating & Bennett, LLP (57) ABSTRACT

To provide a vehicle body structure for an autonomously traveling vehicle that is distinguished for maintainability. A vehicle body structure (1) for an autonomously traveling vehicle that travels on wheels (3) provided on a chassis (2) includes side frames (4R), (4L) that extend in a chassis longitudinal direction on both sides of the chassis with respect to a chassis width direction, first drive units (20) in each of which a drive motor (5) that is for driving the wheel (3), a reduction gear (6), and a drive shaft (7) that drives the wheel (3) are integrally configured, and second drive units (30) which each rotatably hold a drive shaft (7) that drives the wheel (3). The vehicle body structure (1) is characterized in that the first drive units (20) and the second drive units (30) are each provided so as to be integrally mountable in and dismountable from the same side frames.

13 Claims, 4 Drawing Sheets

(51) Int. Cl.
  *B60K 1/02* (2006.01)
  *B60K 7/00* (2006.01)
  *B60K 17/04* (2006.01)
  *F16H 7/12* (2006.01)
  *F16H 37/02* (2006.01)
  *B60K 17/14* (2006.01)
  *B60K 17/342* (2006.01)
  *B62D 21/14* (2006.01)

(52) U.S. Cl.
  CPC .......... *B60K 17/043* (2013.01); *B60K 17/145* (2013.01); *B60K 17/342* (2013.01); *B61B 13/00* (2013.01); *B62D 21/14* (2013.01); *F16H 7/1254* (2013.01); *F16H 37/02* (2013.01); *B60K 2007/0061* (2013.01)

(58) Field of Classification Search
  USPC ........................................................ 180/6.5
  See application file for complete search history.

(56) References Cited

U.S. PATENT DOCUMENTS

| | | | | |
|---|---|---|---|---|
| 4,962,821 | A | * | 10/1990 | Kim ....................... B60K 17/14 180/242 |
| 5,658,120 | A | | 8/1997 | Watanabe |
| 6,968,913 | B1 | * | 11/2005 | Priepke .................. B62D 7/142 180/6.24 |
| 7,497,238 | B2 | * | 3/2009 | Williams ................. B27D 1/10 144/144.52 |
| 2008/0230284 | A1 | * | 9/2008 | Schoon ..................... B60K 1/02 180/6.5 |
| 2009/0032314 | A1 | * | 2/2009 | Speichinger ......... B60K 17/342 180/6.5 |

FOREIGN PATENT DOCUMENTS

| | | |
|---|---|---|
| JP | 2004-306782 A | 11/2004 |
| JP | 2009-119972 A | 6/2009 |
| JP | 2013-63721 A | 4/2013 |

* cited by examiner

VEHICLE BODY STRUCTURE FOR AUTONOMOUSLY TRAVELING VEHICLE

TECHNICAL FIELD

The present invention relates to a vehicle body structure for an autonomously traveling vehicle and particularly relates to a vehicle body structure for an autonomously traveling vehicle that travels on wheels provided on a chassis and on a skid-steer system.

BACKGROUND ART

Among traveling systems for moving objects such as autonomously traveling vehicles, in recent years, the skid-steer system in which left and right wheels are rotated in opposite directions has been known as a method that enables turning on one and the same site.

In accordance with an autonomously traveling vehicle on such a skid-steer system, turning operation can be carried out in a space-saving manner without necessity for a broad turning area.

As a related art, for instance, an industry vehicle which includes a bucket provided in front of a vehicle body and a power source and front and rear wheels connected by chains, in which the bucket is provided in front of the vehicle body, and in which a distance between the front wheels and the rear wheels can be changed has been known (see PTL 1).

CITATION LIST

Patent Literature

PTL 1: Japanese Unexamined Patent Application Publication No. 55-78729

SUMMARY OF INVENTION

Technical Problem

A technique of PTL 1 described above, however, is intended for a service vehicle that handles heavy loads and thus includes a configuration that may involve difficulty in maintenance.

The technique of PTL 1, having a configuration in which the distance between the front drive wheels and the rear drive wheels can be changed, has a problem in that extensive disassembling work may be necessitated in replacement of consumables such as a chain, for instance, because a drive mechanism including the drive wheels and the power source is configured integrally with the vehicle body. In addition, the technique may entail a unit with scarcity in versatility because the drive mechanism is integrally configured.

The invention has been produced in consideration of above conventional problems and it is an object of the invention to provide a vehicle body structure for an autonomously traveling vehicle that is distinguished for maintainability and that is distinguished for versatility.

Solution to Problem

A vehicle body structure for an autonomously traveling vehicle according to the invention for settling the problems described above is as follows.

The invention provides the vehicle body structure for the autonomously traveling vehicle that travels on wheels provided on a chassis, the vehicle body structure including side frames that extend in a chassis longitudinal direction (chassis front-rear direction or traveling direction) on both sides of the chassis with respect to a chassis width direction, first power drivers in each of which drive means (such as a drive motor) that is for driving the wheel, drive transmission means (such as a gearbox), and a drive shaft that drives the wheel are integrally configured, and second power drivers which each rotatably hold a drive shaft that drives the wheel, the vehicle body structure characterized in that the first power drivers and the second power drivers are each provided so as to be integrally mountable in and dismountable from the same side frames.

In the invention, preferably, the drive shafts of the first power drivers and the drive shafts of the second power drivers are respectively connected by endless members (such as endless belts).

In the invention, preferably, the side frames are configured so as to be movable in the chassis width directions with respect to the chassis, that is, so as to make a chassis width variable. Furthermore, the side frames may each be configured as a pipe-like structure having a rectangular section, for instance.

In the invention, preferably, configurations of the side frames each include a first installation surface that is brought into surface contact with top portions of the first power driver and the second power driver and that faces downward and a second installation surface that is brought into surface contact with side portions of the first power driver and the second power driver, configurations of the first power drivers and the second power drivers each include a first mounting portion that is brought into surface contact with the first installation surface of the side frame, on a top portion of each power driver, and a second mounting portion that is brought into surface contact with the second installation surface of the side frame, on a side portion of each power driver, and the first power drivers and the second power drivers are each configured so as to be mountable from outside of the chassis with respect to the side frame (in a direction of axis of the drive shaft).

In the invention, preferably, the configurations of the first power drivers and the second power drivers each include a support member that is to support the first power driver or the second power driver by being brought into contact with a side surface of the side frame facing inside of the chassis in a state in which the power driver is placed in a specified position in the side frame and the support member is configured so as to be placed in such a position as not to interfere with the side frame when the first power driver or the second power driver is mounted in and dismounted from the side frame, so that the first power drivers and the second power drivers are each configured so as to be mountable from the outside of the chassis with respect to the side frame (in the direction of axis of the drive shaft).

In the invention, preferably, mounting positions of each of the second power drivers in the side frame include a first mounting position in which the second power driver is connected to the first power driver through the endless member and a second mounting position which is closer to the first power driver than the first mounting position.

In the invention, preferably, the second power drivers are configured so as to be movable along a longitudinal direction of the side frames by direct drive means (such as linear motors).

In the invention, preferably, adjustment members for adjustment in suspension states of the endless members are provided between the first power drivers and the second power drivers and the adjustment members are configured so as to push up the endless members, by vertical movement of roller-like rotating bodies, for instance, with movement of the second power drivers toward the first power drivers for stationary turning in which left and right drive wheels are rotated in opposite directions, or the like.

Advantageous Effects of Invention

According to the vehicle body structure for the autonomously traveling vehicle of the invention, the vehicle body structure for the autonomously traveling vehicle that travels on the wheels provided on the chassis includes the side frames that extend in the chassis longitudinal direction (chassis front-rear direction or traveling direction) on both the sides of the chassis with respect to the chassis width direction, the first power drivers in each of which the drive means (such as a drive motor) that is for driving the wheel, the drive transmission means (such as a gearbox), and the drive shaft that drives the wheel are integrally configured, and the second power drivers which each rotatably hold the drive shaft that drives the wheel and the first power drivers and the second power drivers are each provided so as to be integrally mountable in and dismountable from the same side frames. Consequently, assembly and disassembly can be performed for each unit and thus the vehicle body structure for the autonomously traveling vehicle that is distinguished for maintainability can be provided. In addition, units including the drive means and the units not including the drive means are separately configured. As a result, separate use of and separate modification to each of the units can be carried out in accordance with specifications of the vehicle and thus the vehicle body structure for the autonomously traveling vehicle that is distinguished for versatility can be provided.

DESCRIPTION OF EMBODIMENTS

First Embodiment

Hereinbelow, embodiments of a vehicle body structure for an autonomously traveling vehicle of the invention will be described with reference to the drawings.

Figure 1:
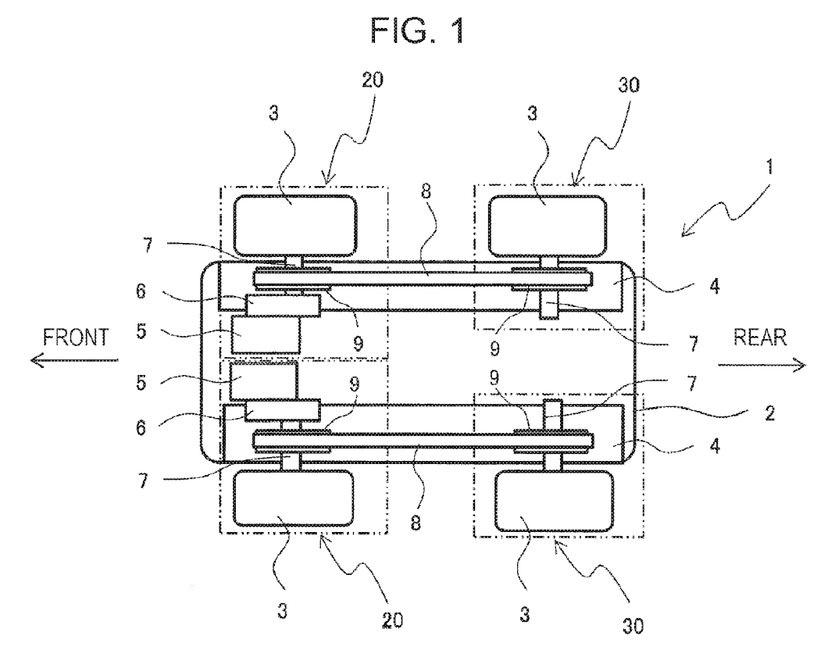
FIG. 1 is an explanatory drawing that illustrates a general configuration of a vehicle body structure for an autonomously traveling vehicle according to a first embodiment of the invention.
Figure 2:
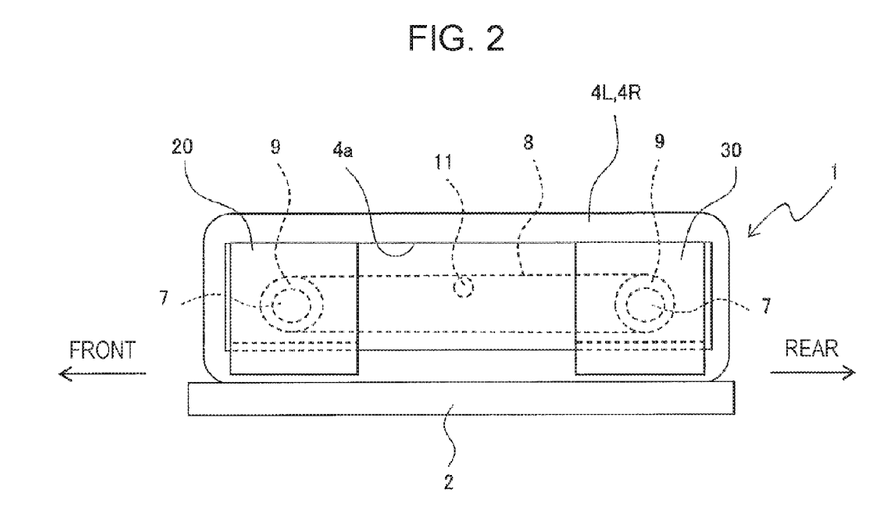
FIG. 2 is a side view that illustrates configurations of a side frame, a first drive unit, and a second drive unit which form the vehicle body structure for the autonomously traveling vehicle.
Figure 3:
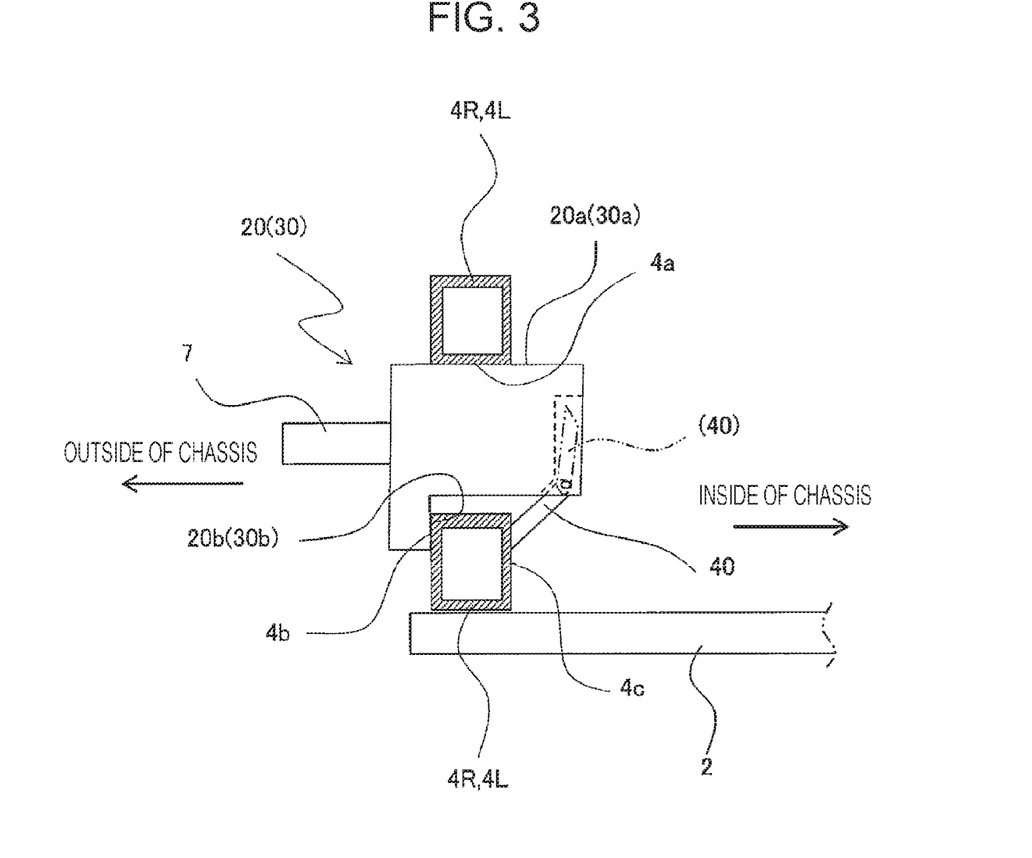
FIG. 3 is an explanatory drawing that illustrates a state of installation of the drive units on the side frame.

FIG. 1 is an explanatory drawing that illustrates a general configuration of a vehicle body structure for an autonomously traveling vehicle according to a first embodiment of the invention, as an example of an embodiment of the invention. FIG. 2 is a side view that illustrates configurations of a side frame, a first drive unit, and a second drive unit which form the vehicle body structure for the autonomously traveling vehicle. FIG. 3 is an explanatory drawing that illustrates a state of installation of the drive units on the side frame.

The vehicle body structure 1 for the autonomously traveling vehicle according to the first embodiment is a vehicle body structure for an autonomously traveling vehicle which travels on wheels 3 provided on a chassis 2, as illustrated in FIG. 1, and in which the vehicle body structure for the autonomously traveling vehicle according to the invention is employed.

Herein, the autonomously traveling vehicle means an apparatus that autonomously travels based on machines or programs without human decision. As such autonomously traveling vehicles, autonomous industrial transporter vehicles that transport objects in plants and the like are known, for instance.

The vehicle body structure 1 for the autonomously traveling vehicle according to the first embodiment chiefly includes a chassis 2, wheels 3, side frames 4R and 4L, drive motors (drive means) 5 that are for driving the wheels 3, reduction gears (drive transmission means) 6, and drive shafts 7 that drive the wheels.

Hereinbelow, characteristic configurations of the vehicle body structure 1 for the autonomously traveling vehicle of the first embodiment will be described with reference to the drawings.

The chassis 2 that forms the vehicle body structure 1 for the autonomously traveling vehicle is configured in shape of a rectangle elongated in a front-rear direction and the side frames 4R and 4L extend on both sides of the chassis 2 with respect to a width direction so as to be elongated in a chassis longitudinal direction.

The side frames 4R and 4L may each be configured as a pipe-like structure having a rectangular section, for instance.

In the first embodiment, the first drive units (first power drivers) 20 in each of which the drive motor 5, the reduction gear (such as a gearbox) 6, and the drive shaft 7 are integrally unitized and the second drive units (second power drivers) 30 in each of which a structure rotatably holding the drive shaft 7 is integrally unitized are configured. In FIG. 1, the wheels 3 have been mounted on the first drive units 20 and on the second drive units 30.

The first drive units 20 and the second drive units 30 are each provided so as to be integrally mountable in and dismountable from the same side frames 4R and 4L.

The first drive units 20 and the second drive units 30 are connected by endless belts (endless members) 8. Reference numerals 9 denote pulleys on which the endless belts 8 are suspended.

Though the endless belts 8 are employed as the endless members, chains may be used in place of the endless belts 8. In this case, sprockets are preferably used in place of the pulleys 9.

Adjustment guide rollers (adjustment members) 11 for adjustment in suspension states of the endless belts 8 are provided between the first drive units 20 and the second drive units 30 so as to be movable in vertical directions.

As illustrated in FIGS. 2 and 3, the side frames 4R and 4L each include a first installation surface 4a that is brought into surface contact with top portions of the first drive unit 20 and the second drive unit 30 and that faces downward and a second installation surface 4b that is brought into surface contact with side portions of the first drive unit 20 and the second drive unit 30 and are configured so that the first drive units 20 and the second drive units 30 can be mounted from outside of the chassis with respect to the side frames.

The first drive units 20 and the second drive units 30 each include a first mounting portion 20a, 30a that is brought into surface contact with the first installation surface 4a of the side frame 4R, 4L, on the top portion of the drive unit 20, 30, and a second mounting portion 20b, 30b that is brought into surface contact with the second installation surface 4b of the side frame 4R, 4L, on the side portion of the drive unit 20, 30.

As illustrated in FIG. 3, the first drive units 20 and the second drive units 30 each further include a support member 40 that is to support the first drive unit 20 or the second drive unit 30 by being brought into contact with a side surface 4c of the side frame 4R, 4L facing inside of the chassis in a state in which the drive unit 20, 30 is installed in a specified position in the side frame 4R, 4L.

The support member 40 is placed in such a position as not to interfere with the side frame 4R, 4L (site depicted by a two-dot chain line in FIG. 3) when the first drive units 20 and the second drive units 30 are mounted in and dismounted from the side frames 4R and 4L. In a state in which the first drive units 20 and the second drive units 30 are installed in the side frames 4R and 4L, the support member 40 emerges so as to be brought into contact with the side surface 4c of the side frame 4R, 4L facing the inside of the chassis and so as to support the first drive unit 20 or the second drive unit 30.

Operations for mounting and dismounting the first drive units 20 and the second drive units 30 may be facilitated by provision of operation switches for making the support members 40 emerge and submerge on side surfaces of the first drive units 20 and the second drive units 30 that are to be positioned on outside of the chassis.

In the vehicle body structure 1 for the autonomously traveling vehicle, according to the first embodiment configured as in above, the side frames 4R and 4L are made to extend on both the sides of the chassis with respect to the chassis width direction so as to be elongated in the chassis longitudinal direction, the first drive units 20 in each of which the drive motor 5, the reduction gear 6, and the drive shaft 7 are integrally unitized and the second drive units 30 in each of which the structure rotatably holding the drive shaft 7 is integrally unitized are configured, and the first drive units 20 and the second drive units 30 are each provided so as to be integrally mountable in and dismountable from the same side frames 4R and 4L. Consequently, assembly and disassembly can be performed for each of the units and thus the vehicle body structure for the autonomously traveling vehicle that is distinguished for maintainability can be provided. In addition, the first drive units 20 including the drive motors 5 and the second drive units 30 not including the drive motors 5 are separately configured. As a result, separate use of each of the units, separate change in the configuration of each of the units, and the like can be carried out in accordance with specifications of the vehicle and thus the vehicle body structure for the autonomously traveling vehicle that is distinguished for versatility can be provided.

In the first embodiment, the configurations of the side frames 4R and 4L each include the first installation surface 4a that is brought into surface contact with the top portions of the first drive unit 20 and the second drive unit 30 and that faces downward and the second installation surface 4b that is brought into surface contact with the side portions of the first drive unit 20 and the second drive unit 30 and the configurations of the first drive units 20 and the second drive units 30 each include the first mounting portion 20a, 30a that is brought into surface contact with the first installation surface 4a of the side frame 4R, 4L, on the top portion of the drive unit 20, 30, and the second mounting portion 20b, 30b that is brought into surface contact with the second installation surface 4b of the side frame 4R, 4L, on the side portion of the drive unit 20, 30. Thus the first drive units 20 and the second drive units 30 are each configured so as to be mountable from the outside of the chassis with respect to the side frame 4R, 4L (in a direction of axis of the drive shaft 7), so that workability and the maintainability can be improved.

Second Embodiment

Subsequently, a second embodiment of the invention will be described with reference to the drawings.

Figure 4:
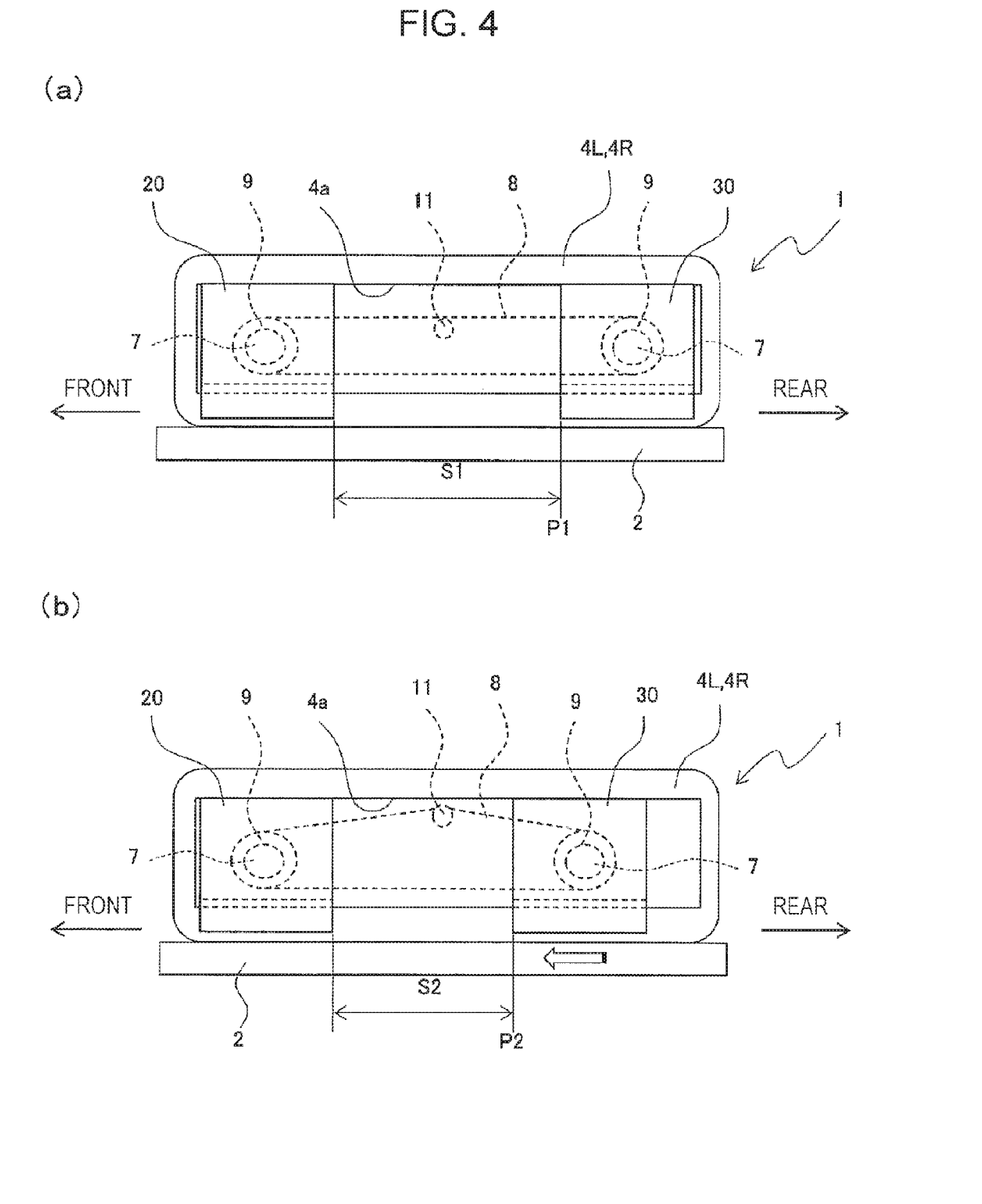
FIG. 4(a) is an explanatory drawing that illustrates a state in which the second drive unit is installed in a first mounting position in the side frame in a vehicle body structure for an autonomously traveling vehicle according to a second embodiment of the invention.
FIG. 4(b) is an explanatory drawing that illustrates a state in which the second drive unit is installed in a second mounting position in the side frame.

FIG. 4(a) is an explanatory drawing that illustrates a state in which the second drive unit is installed in a first mounting position in the side frame in a vehicle body structure for an autonomously traveling vehicle according to a second embodiment of the invention and FIG. 4(b) is an explanatory drawing that illustrates a state in which the second drive unit is installed in a second mounting position in the side frame.

Configurations of the vehicle body structure for the autonomously traveling vehicle of the second embodiment that are similar to the configurations of the vehicle body structure 1 for the autonomously traveling vehicle of the first embodiment are provided with the same reference characters and description thereon is omitted.

In the vehicle body structure 100 for the autonomously traveling vehicle according to the second embodiment, as illustrated in FIGS. 4(a) and 4(b), the second drive units 30 are configured so as to be movable in a longitudinal direction of the side frames 4R and 4L and the second drive units 30 can each be installed in the first mounting position P1 with an ordinary distance S1 in which the second drive unit 30 is connected to the first drive unit 20 through the endless belt 8 or in the second mounting position P2 with a distance S2, the second mounting position P2 being closer to the first drive unit 20 than the first mounting position P1, as a mounting position of the second drive unit 30.

As a method of moving the second drive units 30 from the first mounting position P1 to the second mounting position P2, the second drive units 30 may be moved with use of direct drive means such as linear motors.

The adjustment guide rollers 11 for the adjustment in the suspension states of the endless belts 8 are provided between the first drive units 20 and the second drive units 30 so as to be movable in the vertical directions.

The adjustment guide rollers 11 are configured so as to move in a direction for pushing up the endless belts 8 that loosen with movement of the second drive units 30 toward the first drive units 20.

In the vehicle body structure 100 for the autonomously traveling vehicle, according to the second embodiment configured as above, the second drive units 30 are configured so as to be movable in the longitudinal direction of the side frames 4R and 4L and the second drive units 30 can each be installed in the first mounting position P1 with the ordinary distance S1 in which the second drive unit 30 is connected to the first drive unit 20 through the endless belt 8 or in the second mounting position P2 with the distance S2, the second mounting position P2 being closer to the first drive unit 20 than the first mounting position P1, as the mounting position of the second drive unit 30. Consequently, a so-called wheel base between the wheels 3 of the autonomously traveling vehicle can be made variable in addition to achievement of effects similar to those of the first embodiment. Thus the wheel base optimal for a state of a drive lane can be set and turning performance of the autonomously traveling vehicle can be improved by decrease in the wheel base.

Though the mounting positions of the second drive units 30 are each configured so as to be settable as the two positions in the second embodiment, the mounting positions may each be configured so as to be settable as a further plurality of positions.

Third Embodiment

Subsequently, a third embodiment of the invention will be described with reference to the drawings.

Figure 5:
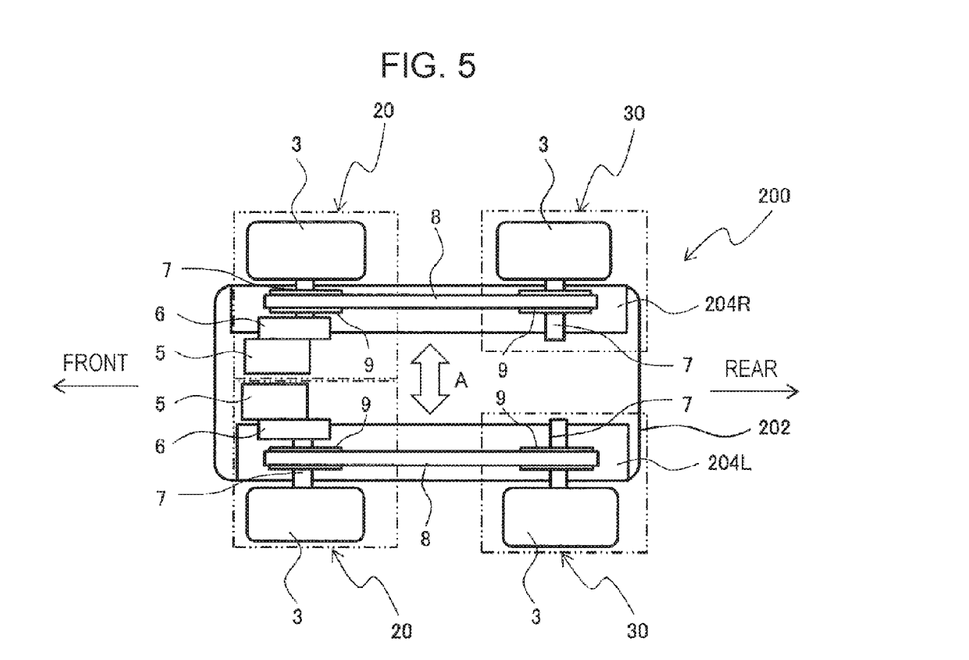
FIG. 5 is an explanatory drawing that illustrates a general configuration of a vehicle body structure for an autonomously traveling vehicle according to a third embodiment of the invention.
Figure 6:
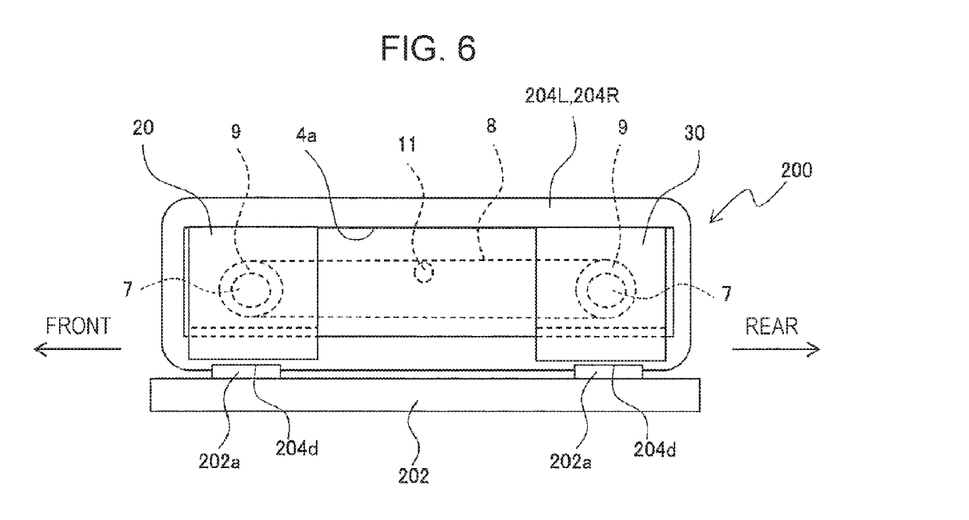
FIG. 6 is a side view that illustrates configurations of a chassis and a side frame which form the vehicle body structure for the autonomously traveling vehicle.

FIG. 5 is an explanatory drawing that illustrates a general configuration of a vehicle body structure for an autonomously traveling vehicle according to a third embodiment of the invention and FIG. 6 is a side view that illustrates configurations of a chassis and side frames which form the vehicle body structure for the autonomously traveling vehicle.

Configurations of the vehicle body structure for the autonomously traveling vehicle of the third embodiment that are similar to the configurations of the vehicle body structure 1 for the autonomously traveling vehicle of the first embodiment are provided with the same reference characters and description thereon is omitted.

In the vehicle body structure 200 for the autonomously traveling vehicle according to the third embodiment, as illustrated in FIG. 5, the side frames 204R and 204L are configured so as to be movable in chassis width directions (in directions of an arrow A) with respect to a chassis 202.

As illustrated in FIG. 6, the chassis 202 includes guide rails 202a that guide movement of the side frames 204R and 204L in the chassis width directions.

The guide rails 202a are respectively provided at two sites on front and rear sides on the chassis 202 so as to extend in parallel along the chassis width directions to both side ends of the chassis 202.

Guide grooves 204d corresponding to the guide rails 202a are formed on the side frames 204R and 204L.

After being moved in the chassis width directions, the side frames 204R and 204L are fixed to the chassis 202 by mounting members not illustrated.

In the vehicle body structure 200 for the autonomously traveling vehicle, according to the third embodiment configured as above, the guide rails 202a are provided on the chassis 202, the guide grooves 204d are formed on the side frames 204R and 204L, and the side frames 204R and 204L are configured so as to be movable in the chassis width directions (in the directions of the arrow A) with respect to the chassis 202. Consequently, distances between the wheels of the autonomously traveling vehicle can be made variable in addition to the achievement of effects similar to those of the first embodiment. Thus the distance between the wheels that is optimal for the state of a drive lane can be set and can be adapted to even a narrow drive lane.

Though a configuration made of the guide rails 202a and the guide grooves 204d is employed in order to make the side frames 204R and 204L movable in the chassis width directions with respect to the chassis 202 in the third embodiment, the invention is not limited thereto.

Though a configuration in which the side frames are placed on the chassis is used as the vehicle body structure for the autonomously traveling vehicle in the embodiments described above, the invention is not limited thereto. For instance, a configuration in which the side frames are placed under the chassis may be used.

As described above, the invention is not limited to the embodiments described above and various modifications may be made within the scope disclosed in the claims. That is, embodiments obtained by combination of technical measures modified appropriately within the scope disclosed in the claims are also encompassed by the technical scope of the invention.

The invention is not limited to the embodiments described above and various modifications may be made within the scope disclosed in the claims. That is, embodiments obtained by combination of technical measures modified appropriately without departing from the purport of the invention are also encompassed by the technical scope of the invention.

INDUSTRIAL APPLICABILITY

The vehicle body structure for the autonomously traveling vehicle of the invention can be used for vehicles for guarding, transporter vehicles, and the like in plants.

REFERENCE SIGNS LIST 1, 100, 200 vehicle body structure
2, 202 chassis
3 wheel
4R, 4L, 204R, 204L side frame
4a first installation surface
4b second installation surface
4c side surface
5 drive motor (drive means)
6 reduction gear (drive transmission means)
7 drive shaft
8 endless belt (endless member)
11 adjustment guide roller (adjustment member)
20 first drive unit (first power driver)
20a, 30a first mounting portion
20b, 30b second mounting portion
30 second drive unit (second power driver)
40 support member
202a guide rail
204d guide groove

The invention claimed is:

1. A vehicle body structure for an autonomously traveling vehicle that travels on wheels provided on a chassis, the vehicle body structure comprising:
   side frames that extend in a chassis longitudinal direction on both sides of the chassis with respect to a chassis width direction;
   first power drivers in each of which a drive motor to drive one of the wheels, a drive transmission, and a drive shaft that drives the one of the wheels are integrally configured; and
   second power drivers which each rotatably hold a drive shaft that drives another wheel, wherein
   the first power drivers and the second power drivers are each provided so as to be integrally mountable in and dismountable from the same side frames.

2. The vehicle body structure for the autonomously traveling vehicle according to claim 1, wherein the drive shafts of the first power drivers and the drive shafts of the second power drivers are respectively connected by endless members.

3. The vehicle body structure for the autonomously traveling vehicle according to claim 2, wherein mounting positions of each of the second power driver in the side frame include a first mounting position in which the second power driver is connected to the first power driver through the endless member and a second mounting position which is closer to the first power driver than the first mounting position.

4. The vehicle body structure for the autonomously traveling vehicle according to claim 3, wherein adjustment members for adjustment in suspension states of the endless members are provided between the first power drivers and the second power drivers and the adjustment members are configured so as to push up the endless members with movement of the second power drivers toward the first power drivers.

5. The vehicle body structure for the autonomously traveling vehicle according to claim 1, wherein mounting positions of each of the second power driver in the side frame include a first mounting position in which the second power driver is connected to the first power driver through an endless member and a second mounting position which is closer to the first power driver than the first mounting position.

6. The vehicle body structure for the autonomously traveling vehicle according to claim 5, wherein adjustment members for adjustment in suspension states of the endless members are provided between the first power drivers and the second power drivers and the adjustment members are configured so as to push up the endless members with movement of the second power drivers toward the first power drivers.

7. The vehicle body structure for the autonomously traveling vehicle according to claim 1, wherein
the side frames each includes
a first installation surface that faces downward is brought into surface contact with the top portions of the first power driver and the second power driver, and
a second installation surface that is brought into surface contact with side portions of the first power driver and the second power driver,
the first power drivers and the second power drivers each includes
a first mounting portion that is brought into surface contact with the first installation surface of the side frame, on a top portion of the power driver, and
a second mounting portion that is brought into surface contact with the second installation surface of the side frame, on a side portion of the power driver, and
the first power drivers and the second power drivers are each configured so as to be mountable from an outside of the chassis with respect to the side frame.

8. The vehicle body structure for the autonomously traveling vehicle according to claim 7, wherein mounting positions of each of the second power driver in the side frame include a first mounting position in which the second power driver is connected to the first power driver through an endless member and a second mounting position which is closer to the first power driver than the first mounting position.

9. The vehicle body structure for the autonomously traveling vehicle according to claim 8, wherein adjustment members for adjustment in suspension states of the endless members are provided between the first power drivers and the second power drivers and the adjustment members are configured so as to push up the endless members with movement of the second power drivers toward the first power drivers.

10. The vehicle body structure for the autonomously traveling vehicle according to claim 1, wherein
the first power drivers and the second power drivers each includes a support member that is to support the first power driver or the second power driver by being brought into contact with a side surface of the side frame facing an inside of the chassis in a state in which the power driver is placed in a specified position in the side frame,
the support member is placed in such a position as not to interfere with the side frame when the first power driver or the second power driver is mounted in and dismounted from the side frame, and
the first power drivers and the second power drivers are each configured so as to be mountable from an outside of the chassis with respect to the side frame.

11. The vehicle body structure for the autonomously traveling vehicle according to claim 10, wherein mounting positions of each of the second power driver in the side frame include a first mounting position in which the second power driver is connected to the first power driver through an endless member and a second mounting position which is closer to the first power driver than the first mounting position.

12. The vehicle body structure for the autonomously traveling vehicle according to claim 11, wherein the second power drivers are configured so as to be movable along a longitudinal direction of the side frames.

13. The vehicle body structure for the autonomously traveling vehicle according to claim 11, wherein adjustment members for adjustment in suspension states of the endless members are provided between the first power drivers and the second power drivers and the adjustment members are configured so as to push up the endless members with movement of the second power drivers toward the first power drivers.

* * * * *